United States Patent [19]

O'Brien et al.

[11] 3,845,972

[45] Nov. 5, 1974

[54] APPARATUS FOR CONNECTING UNDERWATER PIPELINES

[76] Inventors: Billy L. O'Brien, 1400 Pine St.; Heber P. O'Brien, 730 E. 14th St., both of Ada, Okla. 74820

[22] Filed: Nov. 24, 1972

[21] Appl. No.: 309,160

Related U.S. Application Data

[63] Continuation-in-part of Ser. No. 121,788, March 8, 1971, Pat. No. 3,717,002.

[52] U.S. Cl............. 285/24, 285/320, 285/DIG. 21
[51] Int. Cl............................................ F16l 35/00
[58] Field of Search .......... 61/72.3; 285/24, 18, 25, 285/26, 27, 320, 28, 29, DIG. 21; 166/0.5, 0.6

[56] References Cited
UNITED STATES PATENTS

| | | | |
|---|---|---|---|
| 2,565,923 | 8/1951 | Hrdlicka | 285/110 X |
| 2,988,144 | 6/1961 | Conrad | 285/DIG. 21 |
| 3,534,984 | 10/1970 | Shuey | 285/24 |
| 3,604,730 | 9/1971 | Carroll | 285/27 X |
| 3,701,549 | 10/1972 | Koomey | 285/24 X |
| 3,729,941 | 5/1973 | Rochelle | 285/24 |

Primary Examiner—Dave W. Arola
Attorney, Agent, or Firm—Dunlap, Laney, Hessin, Dougherty & Codding

[57] ABSTRACT

An improved apparatus for connecting underwater pipelines including a guide coupling assembly supportingly positioned in a second pipeline having a guide surface engageable with a portion of a first pipeline for guiding the first pipeline into an interconnecting relationship with the second pipeline. In one aspect, the guide coupling assembly also includes a seal member engageable with a portion of the second pipeline and a submergible pump for pumping the water from the first pipeline in an interconnected position of the first and the second pipelines and in an actuated position of the pump. In one other aspect, the apparatus includes a slip ring movably supported on the first pipeline and an alignment assembly for aligning the bolt holes of the slip ring and a flange of the second pipeline for bolting interconnection, the first and the second pipelines each having an underwater connecting end to facilitate the secure interconnection therebetween.

15 Claims, 8 Drawing Figures

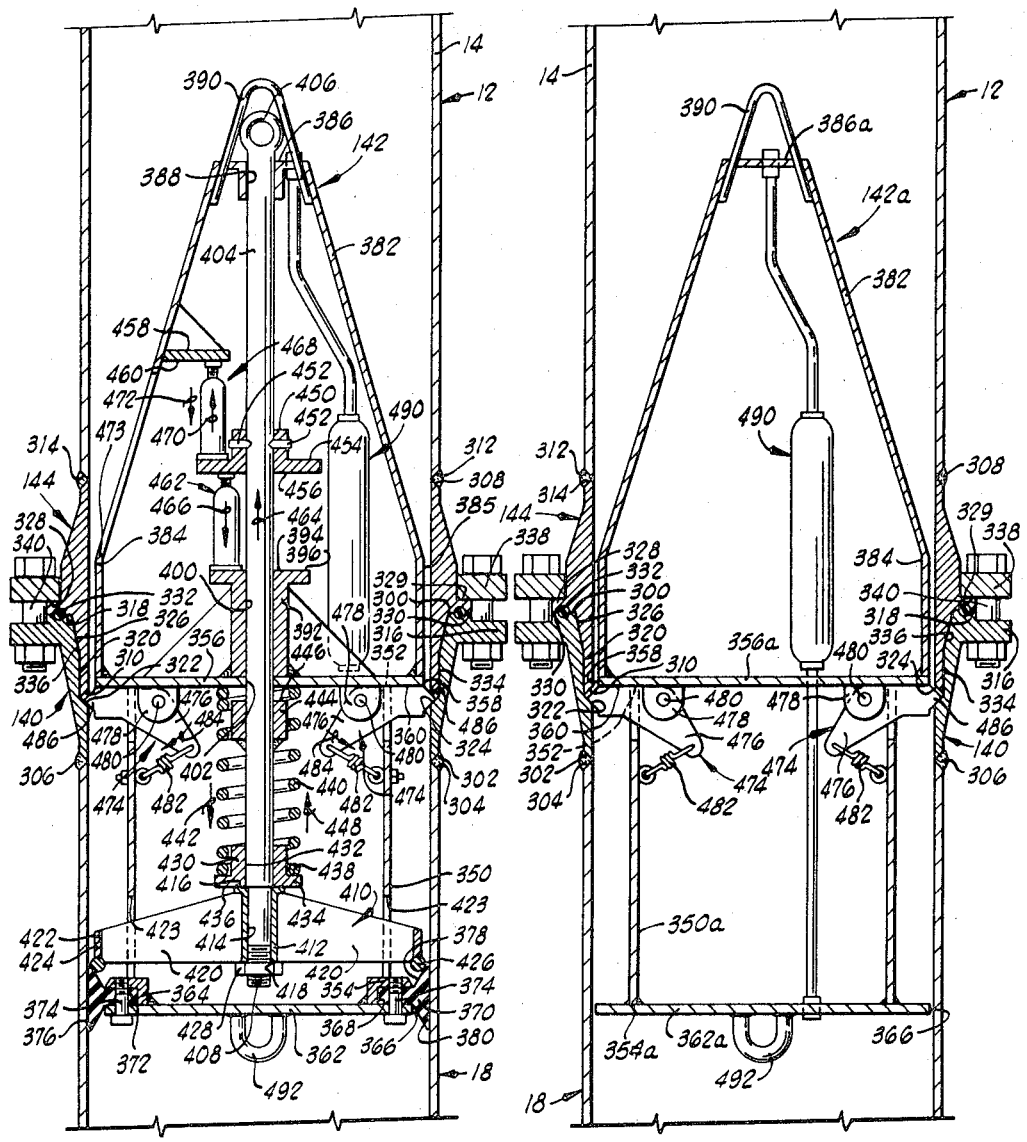
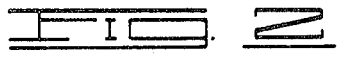 

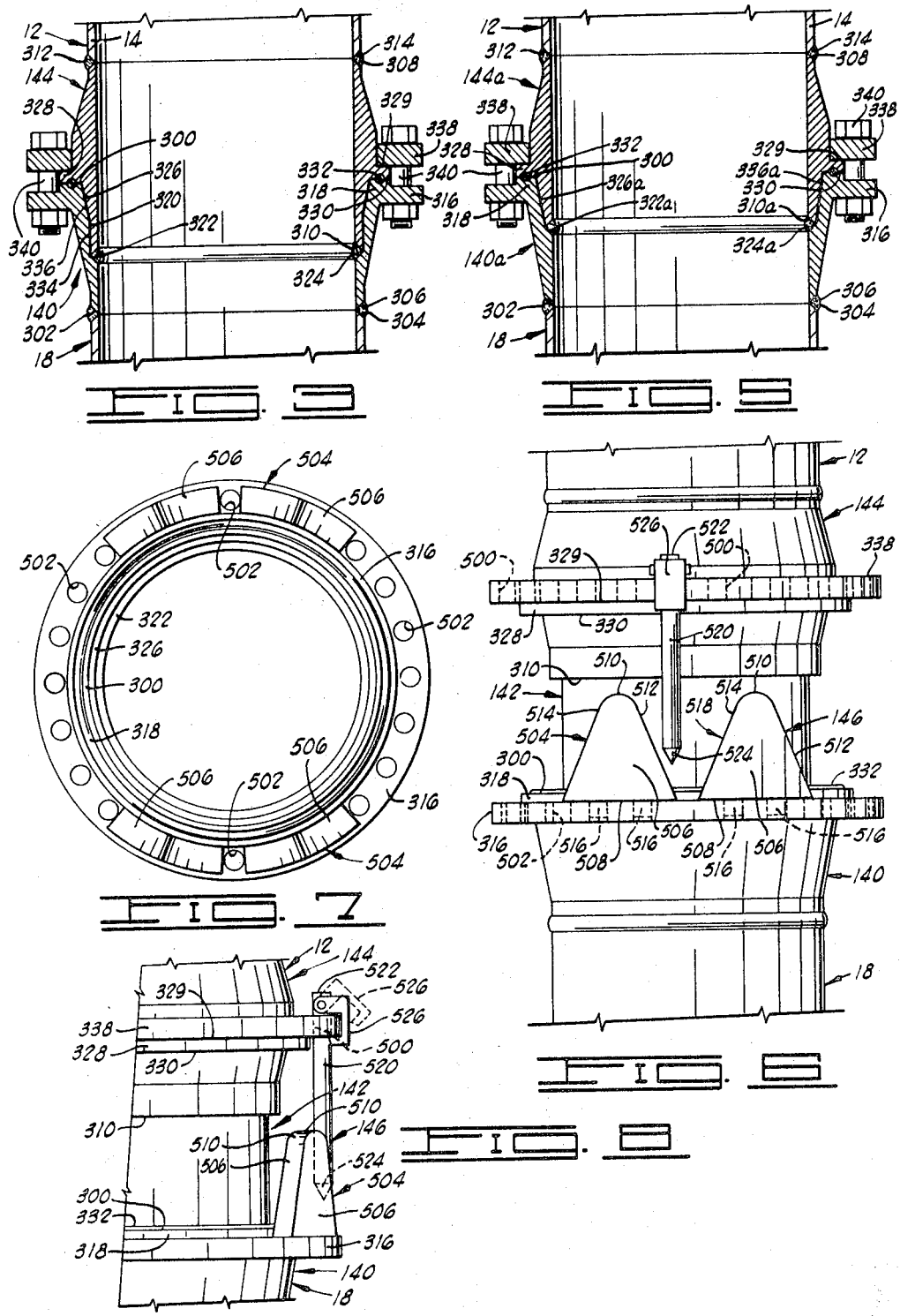

APPARATUS FOR CONNECTING UNDERWATER PIPELINES

REFERENCE TO RELATED APPLICATIONS

This application is a continuation-in-part of the Applicants' co-pending application entitled "METHOD AND APPARATUS FOR CONSTRUCTING AND CONNECTING UNDERWATER RISER", Ser. No. 121,788, filed on Mar. 8, 1971, now U.S. Pat. No. 3,717,002, issued Feb. 20, 1973, to the Applicants' application entitled "RISER-SECTION APPARATUS" filed on an even date with this application Ser. No. 312,572.

BACKGROUND OF THE INVENTION

1. Field of the Invention

This invention relates generally to improvements in apparatus for connecting underwater pipelines and, more particularly, but not by way of limitation, to apparatus for positioning an underwater riser and an underwater pipeline in an interconnecting relationship.

2. Description of the Prior Art

Various methods and apparatus have been proposed in the past for constructing, installing and connecting underwater pipelines and risers. The underwater pipeline has generally been constructed of various pipeline sections interconnected aboard a barge and subsequently positioned on the water-body floor from the barge. The pipeline riser was generally constructed of the plurality of riser-sections which were also interconnected aboard the barge and "stovepiped" or lowered into an interconnecting relationship with one end of the underwater pipeline. The riser-sections were supported by cables generally on one side of the barge in a somewhat interconnecting relationship, and the riser-sections were then welded together at the interconnection therebetween while being thus supported.

The U.S. Pat. No. 3,534,984, issued to Shuey disclosed a method and means for connecting the lower end of a flow conductor or riser pipe to the upper end of a pipe lying at the bottom of a body of water. A frangible disc was connected to the pipe and guide cables were secured to a flange of a female connector member, the upper end portions of the guide cables being secured to a float. The Shuey patent also disclosed a guide assembly for aligning the connecting flanges of the pipelines having a plurality of rams constructed to remain in a retracted position and, after the lower end of the riser or flow conductor was aligned with the upper end of the pipeline, hydraulic cylinders actuated the rams toward an extended position wherein the latch members engage the flange of the pipeline. When the rams were again urged upwardly via hydraulic force, the rams and latch members pulled the two pipeline connectors together. Finally, after the connection was made between the two pipeline connectors, the closure disc was broken via fluid pressure admitted to the upper end of the riser pipe.

The U.S. Pat. No. 3,599,436, issued to Lochridge disclosed a method and apparatus for welding a flowline to a conduit of an underwater installation in a manner obviating the need for sealing and coupling assemblies wherein a chamber or habitat was utilized to isolate the underwater connecting ends of the riser and underwater flowline from the body of water. A funnel was connected to the riser and a plug was connected to the underwater flowline, the funnel functioning as a guide and the plug functioning as a seal. The plug was welded or otherwise secured to the pipeline terminus and subsequently removed via mechanical or torch cutting after the two pipelines were positioned in a connecting relationship and the chamber lowered thereover.

The U.S. Pat. No. 3,258,928, issued to Broadway, disclosed an apparatus for positioning a riser coupled to a pipeline to be laid on the bed of a body of water utilizing two marine support members (a pipelaying barge and an offshore platform) utilizing a monorail coupled to one leg of the platform before installation in the body of water for positioning the riser as the riser's length is increased and lowered.

The U.S Pat. No. 3,373,570, issued to Hindman, disclosed a method and apparatus for installing an underwater pipeline wherein the pipeline was supported on a sling and moved laterally to a position wherein hook receivers secured the pipeline to a platform. The riser was then lowered through sleeves to a connecting position, the pipeline being lowered on a rail to a position wherein a portion thereof was secured to the platform.

The U.S. Pat. No. 1,874,081, issued to Burrows disclosed a pipe supported on supports positioned on the floor of a body of water and a second pipe lowered onto the supports via a hoisting tackle, the second pipe being moved into a connecting position with the first pipe with the aid of divers. The Burrows patent also disclosed a centering device which was removably inserted into one end of the pipe to be lowered.

The U.S. Pat. No. 3,338,596, issued to Knox disclosed a well head connector having positioning apparatus. The U.S. Pat. No. 3,459,442, issued to DeYarmett, described an underwater coupling for connecting a flowline to a riser, the pipe sections being laid on the floor of a body of water in rough alignment, spaced a distance apart and subsequently pulled together by a diver.

The U..S Pat. No. 3,355,899, issued to Koonce, the U.S. Pat. No. 3,410,096, issued to Schuh, and the U.S. Pat. No. 3,260,270, issued to Watkins, each disclosed a cable guiding type of alignment device wherein some type of coupling was utilized for positioning. The U.S. Pat. No. 3,483,708, issued to Marshall, disclosed a method and apparatus for anchoring pipes and the like to an underwater structure or platform during the installation of the pipe, wherein one pipe was anchored to the platform for alignment prior to lowering the pipe to effect an underwater connection. Similar devices were disclosed in the U.S. Pat. No. 3,474,630, issued to Pogonowski; the U.S. Pat. No. 3,501,919, issued to Marshall; the U.S. Pat. No. 3,517,520, issued to Hammett; the U.S. Pat. No. 3,477,236, issued to Burrus; and the U.S. Pat. No. 3,173,271, issued to Wittgenstein.

The U.S. Pat. No. 3,440,826, issued to Kline, disclosed apparatus for laying an underwater pipeline wherein a hoist, a pipe support and a pipe positioner were supported on a floating vessel. The pipe support was pivotably mounted to the barge and received an upper end portion of a pipeline for connection with another pipeline, the joints of pipe being connected at one station and suspended on a guide cable for movement to another station.

The U.S. Pat. No. 3,434,296, issued to Ottoman, disclosed apparatus and method for connecting a flowline to an offshore platform utilizing a track attached to the platform and a guide through which the underwater flowline was pulled toward the water surface. The U.S. Pat. No. 3,466,882, issued to Broussard, also disclosed a method and apparatus for installing a riser on an offshore platform which included a bending guide for bending one end of the pipe to form the riser portion.

The U.S. Pat. No. 3,434,295, issued to Manning, disclosed a submergible vehicle for connecting sections of an underwater pipeline. The U.S. Pat. No. 3,496,728, issued to Slack; the U.S. Pat. No. 3,081,113, issued to Haeber; the U.S. Pat. No. 3,466,878, issued to Esquillan; and the U.S. Pat. No. 3,429,113, issued to Hauber, each disclosed various apparatus and methods for constructing offshore platforms and the various casings and risers associated therewith. The U.S. Pat. No. 3,280,571, issued to Hauber, disclosed a device for laying flexible pipe on a submerged surface.

SUMMARY OF THE INVENTION

An object of the invention is to provide an apparatus for connecting underwater pipelines wherein the sealing integrity between the interconnected pipelines is substantially increased.

Another object of the invention is to provide an apparatus for connecting underwater pipelines in a safer manner, which is economical in construction and operation.

One other object of the invention is to provide an apparatus for connecting underwater pipelines wherein the alignment of the pipelines is accomplished in a faster, more efficient and more positive manner.

A further object of the invention is to provide an apparatus for connecting underwater pipelines wherein the required construction time is substantially reduced.

A still further object of the invention is to provide an apparatus for connecting underwater pipelines which is economical in construction and operation.

Other objects and advantages of the invention will be evident from the following detailed description when read in conjunction with the accompanying drawings which illustrate the various embodiments of the invention.

BRIEF DESCRIPTION OF THE DRAWINGS

FIG. 2 is an enlarged, sectional view showing a preferred embodiment of the guide-coupling apparatus for FIG. 1.

FIG. 3 is an enlarged, sectional view showing a portion of the riser and a portion of the underwater pipeline of FIG. 2 in an interconnected position.

FIG. 4 is a sectional view, similar to FIG. 2, but showing a modified guide-coupling apparatus.

FIG. 5 is an enlarged sectional view, similar to FIG. 3, but showing a modified riser and underwater pipeline interconnection.

FIG. 6 is an enlarged, elevational view showing a flange alignment apparatus utilized to align the bolt holes in the riser and the underwater pipeline for bolting interconnection therebetween.

FIG. 7 is a top elevational view of the end of the underwater pipeline of FIG. 6 having the guide coupling apparatus removed therefrom, and a portion of a pin guide assembly positioned therein.

FIG. 8 is a partial, side elevational view of the flange alignment apparatus of FIG. 6.

DESCRIPTION OF THE PREFERRED EMBODIMENTS

Figure 1:
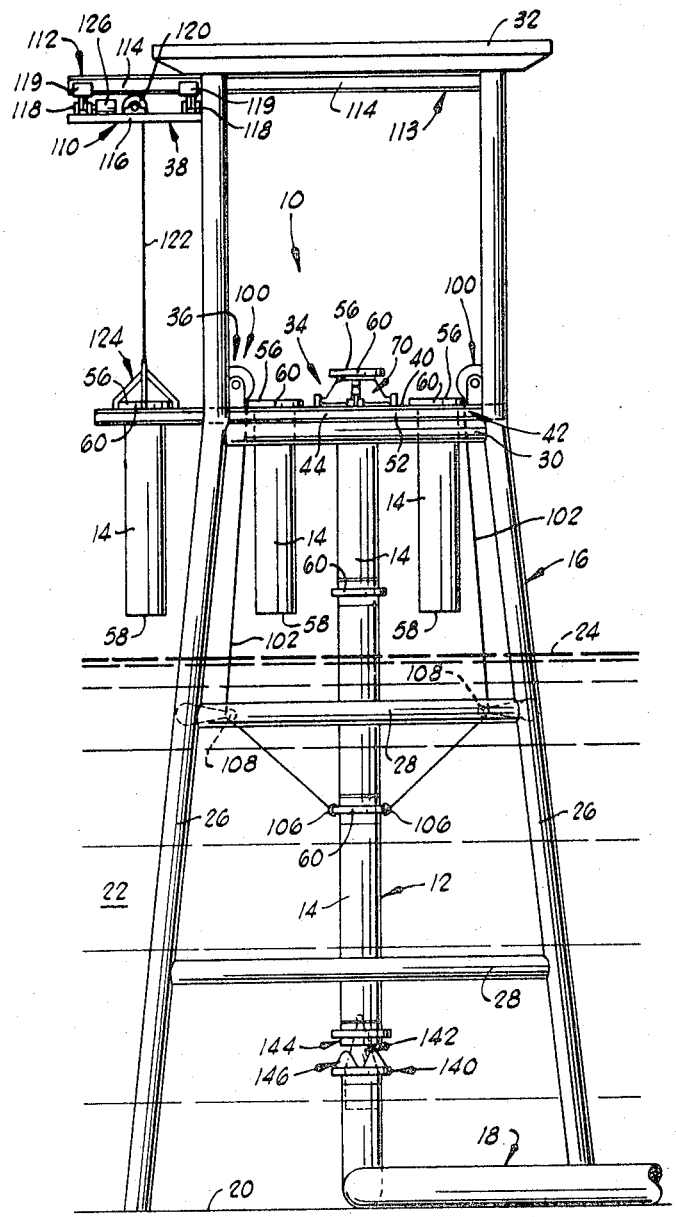
FIG. 1 is a side elevational view of a marine support member, more particularly, a platform having a riser construction apparatus supported thereon for constructing a riser and for connecting the constructed riser to one end of an underwater pipeline.

Referring to the drawings in general, and to FIG. 1 in particular, shown therein and designated by the general reference numeral 10 is a riser construction apparatus for constructing a riser 12 by securedly interconnecting a predetermined number of riser-sections 14 from a support member 16, and connecting one end of the constructed riser 12 to an underwater pipeline 18. The riser construction apparatus 10 is supported in an assembled position upon the support member 16 which is, more particularly, an offshore platform or, in other words, a platform which is supported on a floor 20 of a body of water 22, a portion of the platform 16 being disposed in a body of water 22 generally below a surface 24 thereof. The platform 16 may be of the type commonly utilized with respect to various offshore operations relating to the drilling and production of oil and gas, for example, and basically comprises: a plurality of support legs 26, which are anchored in the floor 20 of the body of water 22; and a plurality of brace members 28, which are securedly interconnected to the support legs 26 (only two of the brace members 28 and only two of the support legs 26 are shown in FIG. 1, for the purpose of clarity of description).

The platform 16 includes a first operating deck 30 supported thereon generally above the surface 24 of the body of water 22. A portion of the first operating deck 30 is secured to a portion of each of the support legs 26, and is generally supported on the platform 16 thereby. A second operating deck 32 is supported by the support legs 26 on the platform 16, a distance generally above the first operating deck 30. The first and the second operating decks 30 and 32 may be of the type generally adapted to support various well-drilling and servicing equipment and, in some installations, the second operating deck 32 may be removable for temporary utilization during certain portions of the overall construction operation. The construction and utilization of various offshore support members, such as the platform 16, generally described above, is well-known in the art and a detailed description thereof is not required herein.

The riser construction apparatus 10 generally includes: a riser support assembly 34 and a riser lowering assembly 36, each being supported on a portion of the first operating deck 30; and a positioning assembly 38 supported on a lower side portion of the second operating deck 32, generally between the first operating deck 30 and the second operating deck 32. The support assembly 34 and the riser lowering assembly 36 are securedly supported on a base plate 40 which is connected to a support frame 42, the riser-sections 14 being securedly supported through apertures or the like formed through portions of the base plate 40.

As generally shown in FIG. 1, each riser-section 14 has a connecting upper end 56 and a connecting lower end 58 formed thereon. The connecting upper end 56 of each riser-section 14 is shaped to interconnectingly mate with the connecting lower end 58 of another riser-section 14, in such a manner that the riser-sections 14 can be securedly joined to form the riser 12. In a preferred form, the connecting lower end of one of the riser-sections 14 is, more particularly, an underwater connecting end and is positioned or interconnected to the other riser-sections 14 to form an underwater connecting end of the constructed riser 12.

A support ring 60 is formed about the outer periphery of each riser-section 14, generally near the connecting upper end 56 thereof. Each support ring 60 extends a distance generally radially from one of the riser-sections 14, each support ring 60 being shaped and sized to extend a sufficient distance from one of the riser-sections 14 such that, when one of the riser-sections 14 is lowered into a stored position through one of the apertures in the base plate 42, a portion of the support ring 60 engages a portion of the base plate 40 to cooperatively support the riser-sections 14 in a stored position therein. It should also be noted that the support ring 60 of each riser-section 14 is also shaped and disposed to engagingly contact a portion of the riser support assembly 34, in one position of the riser support assembly 34, during the construction of the riser 12.

The riser support assembly 34 includes support arm assemblies 70 (one being shown in FIG. 1) secured to a portion of the base plate 40, the support arm assemblies 70 being controllingly positionable to engage the support ring 70 of one of the riser-sections 14 supporting the engaged riser-section 14 and to release the riser-section 14 for lowering generally toward the underwater pipeline 18. The riser lowering assembly 36 is constructed to guidingly lower the constructed riser 12 in a direction generally toward the underwater pipeline 18 to a position wherein the riser 12 connectingly engages the underwater pipeline 18 and includes a pair of winch assemblies 100 supported on the base plate 40, each winch assembly 100 having a winch cable 102 connected thereto and removably connected to a portion of the interconnected riser-sections 14. More particularly, a connecting rod 106 of each winch cable 102 is removably connected to the support ring 60 of one of the riser-sections 14 and a portion of each winch cable 102 is disposed in guiding engagement with a guide pulley 108 secured to a portion of the platform 16.

The positioning assembly 38 includes an overhead crane assembly 110 which is rollingly connected to a transverse track assembly 112. The transverse track assembly 122 is rollingly connected to a lateral track assembly 113. A crane support frame 116 is rollingly connected to the transverse track assembly 112 via a plurality of interconnecting roller assemblies 118 and a crane winch 120 is supported on a portion of the crane support frame 116. A crane cable 122 has one end connected to the crane winch 120 and a riser section connector 124 is secured on the opposite end of the crane cable 122. The transverse track assembly 112 is rollingly connected to the lateral track assembly 113 via a plurality of roller assemblies 119. The crane winch 120 is driven by a winch drive 126 supported on a portion of the crane support frame 116.

The underwater pipeline 18 is constructed of a plurality of interconnected pipe-sections and an underwater connecting end 140 is connected to one end of the underwater pipeline 18. The underwater connecting end 140, referred to sometimes below as the pipeline underwater connecting end 140, is constructed to interconnectingly engage one end of the constructed riser 12, in one position of the constructed riser 12 and the underwater pipeline 18.

A guide coupling assembly 142 is removably disposed in a portion of the underwater pipeline 18 generally near the end of the underwater pipeline 18 having the underwater connecting end 140 connected thereto, as shown in FIG. 1. A portion of the guide coupling assembly 142 is shaped and disposed to guidingly engage a portion of the constructed riser 12, generally near an underwater connecting end 144 thereof, to guide the constructed riser 12 to a position wherein the underwater connecting end 144 of the constructed riser 12 connectingly engages a portion of the underwater connecting end 140 of the underwater pipeline 18, in a manner to be described in greater detail below.

As mentioned before, each of the riser-sections 14 has a connecting upper end 56 and a connecting lower end 58; however, in a preferred form and as shown in FIG. 1, one of the riser-sections 14 has an upper end 56 and the underwater connecting end 144 is connected to the end thereof opposite the upper end 56 thereof. The riser-section 14 are interconnected to form the constructed riser 12 such that the underwater connecting end 144 connected to the one riser-section 14 forms the lowermost end or the underwater connecting end 144 of the constructed riser 12. It is apparent from the foregoing that the constructed riser 12 is formed from a predetermined number of riser-sections 14 wherein one of the riser-sections 14 has an upper end 56 and an underwater connecting end 144, and each other riser-section 14 has an upper end 56 and a lower end 58. The riser-sections 14 are interconnected such that the connecting upper end 56 of some of the riser-sections 14 is interconnected to the connecting lower end 58 of one other riser-section 14 to form the constructed riser 12.

The riser construction apparatus 10 also includes a flange alignment assembly 146 which is supported generally between the underwater connecting end 144 of the one riser-section 14 and the underwater connecting end 140 connected to the underwater pipeline 18. The flange alignment assembly 146 is constructed to align the bolt holes (not shown in FIG. 1) of the underwater connecting end 140 connected to the underwater pipeline 18 with the bolt holes through a portion of the underwater connecting end 144 of the one riser-section 14 for bolting interconnection therebetween, in a manner and for reasons which will be described in greater detail below.

The riser construction apparatus 10, described above, is constructed and positioned to facilitate the construction of the riser 12 from the support member 16, and to position the lowermost end of the constructed riser 12, that is the underwater connecting end 144 thereof, in an interconnectingly engaging position with the underwater connecting end 140 of the underwater pipeline 18, so that the constructed riser 12 can be safely and securely joined to the underwater pipeline 18.

During the construction of the riser 12, the overhead crane assembly 110 is transversely and laterally positioned on the transverse track assembly 112 and the lateral track assembly 113, respectively, generally over or above one of the stored riser-sections 14. The winch drive 126 is then actuated to a lowering position, thereby removing the crane cable 122 in a downwardly direction generally toward the base plate 40. The crane cable 122 is lowered to a position wherein the riser section connector 124 is disposed generally near the connecting upper end 56 of one of the riser-sections 14. The operator then secures the riser section connector 124 to the riser-section 14 or, more particularly, to the support ring 60 of the riser-section 14.

After the riser-section connector 124 is secured to one of the riser-sections 14, the winch drive 126 is then actuated to a raising position wherein the crane cable 122 is retrieved on the crane winch 120 or, in other words, wherein the crane cable 122 is moved in an upwardly direction generally toward the positioning assembly 38, thereby raising the riser-section 14 connected thereto via the riser section connector 124. The overhead crane assembly 110 will continue to move the riser-section 14 connected thereto in an upwardly direction to a position wherein the connecting lower end 58 of the riser-section 14 is disposed a distance vertically above the base plate 40 and thus removed from the support apertures 54.

The operator will then move the overhead crane assembly 110 transversely acros the transverse track assembly 112 and move the transverse track assembly 112 laterally across the lateral track assembly 113 to a position wherein the riser-section 14 connected thereto is disposed generally above the riser support assembly 34. The overhead crane assembly 110 or, more particularly, the winch drive 126 is then actuated to a lowering position, thereby lowing the riser-section 14 connected thereto in a generally downwardly direction toward the base plate 40.

The riser-section 14 is lowred by the overhead crane assembly 110 to a position wherein the support ring 60 is supportingly engaged by the support arm assembly 70. It should be noted that, in a preferred form, the first riser-section 14 supported in the riser support assembly 34 is, more particularly, that one riser-section 14 having the underwater connecting end 144 connected thereto. The operator will then release and remove the riser section connector 124 from the support ring 60 of the supported riser-section 14, thereby disconnecting the supported riser-section 14 from the positioning assembly 38. The winch drive 126 of the positioning assembly 38 is then actuated to a raising position, and the overhead crane assembly 110 is then moved laterally and transversely on the track assemblies 112 and 113 to a position wherein the overhead crane assembly 110 is disposed generally above another or a subsequent riser-section 14. The winch drive 126 is then actuated to a lowering position, thereby lowering the riser section connector 124 to a position for interconnection thereof to the subsequent riser-section 14.

After the riser section connector 124 is secured to the support ring 60 of the riser-section 14, the winch drive 126 is then actuated to a raising position, thereby raising the riser-section 14 connected thereto. The riser-section 14 is raised in a generally upwardly direction and removed from the support aperture 54. The overhead crane assembly 110 is then laterally and transversely positioned over the base plate 40 to a position wherein the riser-section 14 connected thereto is disposed generally over the riser support assembly 34. The overhead crane assembly 110 is then actuated to a lowering position, thereby lowering the riser-section 14 connected thereto generally toward the riser support assembly 34 or, more particularly, generally toward the supported riser-section 14 which is securedly supported in the riser support assembly 34. The riser-section 14 supported by the positioning assembly 38 is lowered to a position wherein the connecting lower end 58 thereof is positioned in a mating, interconnecting relationship with respect to the connecting upper end 56 of the riser-section 14, which is supported in the riser support assembly 34.

After the connecting lower end 58 of the riser-section 14 supported by the positioning assembly 38 is then moved into a mating, interconnecting relationship with respect to the connecting upper end 56 of the riser-section 14 supported in the riser support assembly 34 the two riser-sections 14 are then secured together such as, for example, by welding or bolting two riser-sections 14 together. The riser support assembly 34 maintains the riser-section 14 supported therein in a firm and secure position such that the movement of the supported riser-section 14 is substantially reduced or virtually eliminated. The positioning assembly 38 cooperates to maintain the position of the riser-section 14 connected thereto in a manner relatively free of movement, and connecting upper end 56 and connecting lower end 58 of each riser-section 14 is also shaped in a preferred form, to coooperate with the riser support assembly 34 and the positioning assembly 38 to maintain the interconnecting disposition of the riser-sections 14 during the welding or other interconnecting operation to assure a sealingly secure interconnection between the two riser-sections.

After the two riser-sections 14 have been secured in an interconnected relationship, as described above, the winch drive 126 of the positioning assembly 38 is actuated to a raising position, thereby raising the two interconnected riser-sections 14 in a generally upwardly, vertical direction. The two interconnected riser-sections 14 are raised upwardly by the positioning assembly 38 to a position wherein the riser support assembly 34 is disengaged from the riser-section 14 supported thereby. Each connecting end portion 106 of the riser lowering assembly 36 is then removably, securedly connected to the support ring 60 of the riser-section 14, thereby connecting the riser lowering assembly 36 to a portion of the partially constructed riser 12.

After the riser support assembly 34 has been positioned in the release position, the overhead crane assembly 110 is actuated to a lowering position, thereby lowering the two interconnected riser-sections 14 through the riser support assembly 34 through the riser opening 66, to a position wherein the connecting upper end 56 of the last connected riser-section 14 is disposed in a horizontal plane generally above the riser support assembly 34. The riser support assembly 34 is then actuated to a support position, as described before, and the interconnected riser-sections 14 are further lowered to a position wherein the connecting upper end portion 56 of the last connected riser-section 14 is securedly and supportingly engaged by the riser support assembly 34, in a manner similar to that described in detail before with respect to the riser-section 14 first supportingly positioned in the riser support assembly 34.

The riser section connector 124 is then disconnected from the riser-section 14, and the two interconnected riser-sections 14 are then securedly supported and positioned in a predetermined horizontal plane by the riser support assembly 34, in a manner similar to that described before. The positioning assembly 38 is then utilized to move another riser-section 14 to a position wherein the connecting lower end 58 of that riser-section 14 is matingly and interconnectingly disposed with respect to the connecting upper end 56 of the riser-section 14 supported in the riser support assembly 34, in a manner similar to that described above. The connecting lower end 58 of the riser-section 14 supported by the positioning assembly 38 is then secured to the connecting upper end 56 of the riser-section 14 supported in the riser support assembly 34, in a manner similar to that described above. The positioning assembly 38 is actuated to disengage the supported riser-sections 14 from the riser support assembly 34, and to lower the interconnected riser-sections 14 through the riser support assembly 34 and through the riser opening 66 to a position wherein the connecting upper end 56 of the last connected riser-section 14 is securely and supportingly engaged by the riser support assembly 34.

After the riser-sections 14 have been securely interconnected to form the constructed riser 12, the riser lowering assembly 36 is utilized to lower the constructed riser 12 in a generally downwardly direction toward the underwater connecting end rod 140 connected to the underwater pipeline 18. The riser lowering assembly 36 is, more particularly, utilized to lower the constructed riser 12 to a position wherein the underwater connecting end 144 thereof is positioned in mating and interconnecting engagement with the underwater connecting end 140 of the underwater pipeline 18, as will be described in greater detail below.

In one form, the riser lowering assembly 36 can be utilized solely to lower the constructed riser 12, and the positioning assembly 38 can be utilized to provide a stationary, augmenting support for the interconnected riser-sections 14 during the lowering thereof. In another form, the riser lowering assembly 36 and, more particularly, the winch cables 102 thereof can be utilized solely to lower the constructed riser 12.

In a preferred form, and as will be described in greater detail below, the guide coupling assembly 142 and the flange alignment assembly 146 are each disposed in a portion of the underwater pipeline 18 generally near the underwater connecting end 140 thereof. The guide coupling assembly 142 and the flange alignment assembly 146 each cooperate to position the underwater connecting end 144 of the constructed riser 12 in an interconnecting relationship with respect to the underwater connecting end 140 of the underwater pipeline 18. More particularly, the guide coupling assembly 142 guidingly engages the underwater connecting end 144 of the constructed riser 12 to guide the underwater connecting end 144 in an interconnecting relationship with respect to the underwater connecting end 140 of the underwater pipeline 18, as the constructed riser 12 is lowered in a generally downwardly direction toward the underwater connecting end 140 of the underwater pipeline 18. The flange alignment assembly 146, more particularly, cooperates to align the bolt holes of the underwater connecting end 144 with the bolt holes of the underwater connecting end 140 for bolting interconnection therebetween in a manner which will be described in more detail below.

The riser lowering assembly 36 will be actuated to initially lower the constructed riser 12 to a position wherein the underwater connecting end 144 thereof is disposed in a horizontal plane generally above the underwater connecting end 140 of the underwater pipeline 18. The riser lowering assembly 36 is then utilized to maintain the constructed riser 12 in a predetermined horizontal plane until such time as the underwater interconnection between the constructed riser 12 and the underwater pipeline 18 can be effected by a diver. The diver will position himself generally near the underwater connecting ends 140 and 144 of the pipeline 18 and the constructed riser 12, respectively, and then, in a preferred form, the riser lowering assembly 36 will be actuated to further lower the constructed riser 12 to a position wherein the underwater connecting end 144 of the riser 12 interconnectingly and matingly joins the underwater connecting end 140 of the underwater pipeline 18. The diver will then secure the constructed riser 12 to the underwater pipeline 18 such as, for example, by bolting or by bolting and welding the underwater connecting end 144 of the riser 12 to the underwater connecting end 140 of the underwater pipeline 18.

It will be apparent from the foregoing that the riser construction apparatus 10, shown in FIG. 1, thus provides an apparatus and a method for constructing an underwater riser in a safe and efficient manner, and a manner assuring a sealingly secure interconnection between the various riser-sections 14 and between the underwater interconnecting ends of the riser and the underwater pipeline. The two riser-sections 14 which are being interconnected during any one portion of the operation of the riser construction apparatus 10 are securedly positioned in an interconnecting relationship by the riser support assembly 34 and the riser positioning assembly 38, thereby substantially reducing or virtually eliminating relative movement between the two riser-sections 14 being thus interconnected. In those instances where the interconnection between the two riser-sections must be effected while relative movement between the two riser-sections is occurring, as in the past, the interconnecting weld material or the seal element disposed between the end of the two riser-sections being interconnected will be continually fractured, cracked or damaged, thus making it virtually impossible to assure a sealingly secure interconnection.

The riser construction apparatus 10 is particularly adapted to be supported by a marine support structure 16, such as the platform 16, shown in FIG. 1, thereby permitting the various technical personnel responsible for the construction of the riser 12 to perform their various responsibilities and functions from a stable supporting structure, and further since the relative movement between the two riser-sections 14 being interconnected is virtually eliminated, their various functions and responsibilities can be effected under safe overall working conditions. It should also be noted that since the two riser-sections 14 are securely positioned and supported in a mating and interconnected relationship during the interconnecting operation, in a manner as described above, the various riser-sections 14 can be interconnected to form the constructed riser 12 independent of the particular condition of the body of water 22 into which the constructed riser 12 will ultimately be disposed. More particularly, the interconnection between the various riser-sections 14 can be effected utilizing the riser construction apparatus 10 even during those times when a high tide or a rough water condition exists with respect to the body of water 22 generally about or near the marine support structure 16, thereby effecting the construction of the riser 12 in a more efficient manner. The details of the construction and operation of the various components and assemblies generally referred to above are fully described in the Applicants' copending application entitled "METHOD AND APPARATUS FOR CONSTRUCTING AND CONNECTING UNDERWATER RISERS", Ser. No. 121,788, referred to before.

In a preferred form, as shown in FIGS. 2 and 3, the underwater connecting end 140 of the underwater pipeline 18 and the underwater connecting end 144 of the constructed riser 12 are each constructed as a separate, individual component, the underwater connecting end 140 being secured to one end of one of the pipe-sections forming the underwater pipeline 18 and the underwater connecting end 144 being secured to the lowermost end of the first connected or the lowermost riser section 14. The underwater connecting end 140 is thus sometimes referred to below as the pipeline underwater connecting end 140, and the underwater connecting end 144 is sometimes referred to below as the riser underwater connecting end 144.

Referring more particularly to the underwater connecting end 140, as shown more clearly in FIG. 3, the underwater connecting end 140 has an uppermost end 300 and a lower end 302. The lower end 302 of the underwater connecting end 140 is secured to an upper end 304 of the underwater pipeline 18 and, in a preferred form, the lower end 302 of the underwater connecting end 140 and the end 304 of the underwater pipeline 18 are each beveled such that when the underwater connecting end 140 is placed in an interconnecting relationship with respect to the underwater pipeline 18, the beveled ends 302 and 304 form a V-shaped groove 306 which extends about the periphery of the interconnection therebetween. The V-shaped groove 306 is provided to facilitate the welding interconnection between the underwater connecting end 140 and the underwater pipeline 18, as shown in FIGS. 2 and 3.

The underwater connecting end 144 has a beveled upper end 308 and a beveled lowermost end 310. As shown more clearly in FIG. 3, the upper end 308 of the underwater connecting end 144 is secured to a beveled lowermost end 312 of the lowermost riser-section 14 of the constructed riser 12. In an assembled position of the underwater connecting end 144, the upper end 308 thereof and the lowermost end 312 of the constructed riser 12 cooperate to provide or form a V-shaped groove 314 to facilitate the wlding interconnection between the one riser-section 14 and the underwater connecting end 144.

An annular flange 316 is formed on the outer periphery of the underwater connecting end 140. The flange 316 extends generally radially from the outer periphery of the underwater connecting end 140, and has a plurality of bolt holes (not shown) formed therethrough and spaced circumferentially thereabout, for reasons which will become more apparent below.

An annular raised face 318 is formed on a portion of the flange 316, the uppermost end of the raised face 318 forming the uppermost end 300 of the underwater connecting end 140. The raised face 318 extends circumferentially about the underwater connecting end 140, and cooperates with the flange 316 to provide what is generally referred to in the art as a raised face flange connection on the underwater connecting end 140 of the underwater pipeline 18.

A groove 320 is formed in a portion of the inner periphery of the underwater connecting end 140, extending a distance axially along the inner periphery thereof, terminating with a beveled end 322. The beveled end 322 formed in the underwater connecting end 140, more particularly, forms a beveled surface 322 which extends about the inner periphery of the underwater connecting end 140. The beveled surface 322 of the underwater connecting end 140 cooperates with the beveled end 310 of the underwater connecting end 144 to form a V-shaped locking groove 324 in an interconnected position of the underwater connecting ends 140 and 144. The V-shaped locking groove 324 is provided to facilitate the welding interconnection and to cooperatingly engage a portion of the guide coupling assembly 142 to position the guide coupling assembly 142 in the underwater pipeline 18, as will be described in greater detail below.

As shown more clearly in FIG. 3, a radially outwardly tapering surface 326 is formed in a portion of the groove 320, thereby forming an annular tapered surface 326 extending about the inner periphery of the underwater connecting end 140. A portion of the tapered surface 326 intersects the uppermost end 300 of the underwater connecting end 140. The surface formed by the groove 320, and the annular tapered surface 326 of the underwater connecting end 140 is shaped to guidingly and contactingly engage a portion of the underwater connecting end 144, as will be described in more detail below.

An annular flange 328 is formed about a portion of the outer periphery of the underwater connecting end 144, generally between the upper end 308 and the lower end 310 thereof. The annular flange 328 extends a distance generally radially from the underwater connecting end 144, thereby forming an annular upwardly facing surface 329 and an annular downwardly facing surface 330, each extending about the outer periphery of the underwater connecting end 144. The downwardly facing surface 330 formed by the flange 328 is positioned on the underwater connecting end 144 to contactingly engage a portion of the uppermost end 300 of the underwater connecting end 140, in an interconnected position of the constructed riser 12 and the underwater pipeline 18.

The uppermost end 300 of the underwater connecting end 140 and the downwardly facing surface 330 of the underwater connecting end 144 are each shaped to receive a seal gasket 332 which is sealingly disposed therebetween. In one form, the seal gasket 332 could provide the sealing integrity between the constructed riser 12 and the underwater pipeline 18 and, in another form, the seal gasket 332 provides a temporary fluid seal between the constructed riser 12 and the underwater pipeline 18 to sealingly prevent the leakage of fluid therebetween until such time as the welding interconnection can be effected. In this latter form, the seal gasket 332 remains in position to augment the primary sealing integrity provided by the welding interconnection formed between the constructed riser 12 and the underwater pipeline 18.

A groove 334 is formed in a portion of the outer periphery of the underwater connecting end 144 of the constructed riser 12, extending a distance axially along the outer periphery thereof. A radially outwardly tapering surface 336 is formed in a portion of the groove 330, thereby forming annular tapered surface 336 extending about the outer periphery of the underwater connecting end 144 and intersecting a portion of the outer periphery thereof. The surfaces formed in the underwater connecting end 144 by the groove 334 and the tapered surface 336 are each shaped to guidingly and matingly engage the surfaces formed in the underwater connecting end 140 by the groove 320 and the tapered surface 326, respectively, to position the constructed riser 12 in an interconnecting relationship with respect to the underwater pipeline 18.

An annular slip ring 338 is disposed about the underwater connecting end 144 of the one riser-section 14. More particularly, the upwardly facing surface 329 of the flange 328 is shaped to slidingly and supportingly engage the slip ring 338, thereby supporting the slip ring 338 on the underwater connecting end 144 in one direction. A plurality of bolt holes (not shown) are formed through the slip ring 338, and the bolt holes formed therethrough are spaced circumferentially about the slip ring 338 to cooperatingly align with the bolt holes (not shown) formed through the flange 316, such that in the interconnecting and assembled position of the constructed riser 12 and the underwater pipeline 18, shown in FIG. 3, the bolt holes of the slip ring 338 and the bolt holes of the flange 316 receive a plurality of interconnecting bolts 340.

It should be noted that, in an alternate form, a flange could be formed on the outer periphery of the underwater connecting end 144 having the bolt holes formed therethrough in lieu of the slip ring type of connecting end described above. Although this alternate form may, in some instances, be less expensive to manufacture, the slip ring type of connecting end is preferred, since it does facilitate a quicker, more efficient alignment of the bolt holes for the underwater bolting interconnection.

Referring more particularly to the guide coupling assembly 142, as shown in FIG. 2, the guide coupling assembly 142 is constructed to be securedly, removably and sealingly positioned in a portion of the underwater pipeline 18 to sealingly prevent fluid from entering the underwater pipeline 18 via one end thereof and to guidingly contact a portion of the constructed riser 12 as the constructed riser 12 is being lowered into an interconnecting relationship with respect to the underwater pipeline 18, in a manner which will be described in more detail below.

The guide coupling assembly 142 includes a hollow, tubular shaped support base 35 having an upper end 352 and a lower end 354. The support base 350 is disposed in a portion of the underwater pipeline 18 generally near the underwater connecting end 140 connected thereto, in an assembled position of the guide coupling assembly 142.

A circular shaped plate 356 is secured to the upper end 352 of the support base 350. The circular shaped plate 356 is sized to encompass the upper end 352 and, more particularly, the diameter of the plate 356 is larger than the diameter of the support base 350 and thus a portion of the plate 356, generally adjacent an outer periphery 358 thereof, extends beyond the outer periphery of the support base 350. The portion of the plate 356 extending beyond the outer periphery of the support base 350 provides an annular downwardly facing surface 360 extending generally radially from the support base 350 and about the entire outer periphery thereof, for reasons which will be made more apparent below.

A circular-shaped, lower end plate 362 is connected to the lower end 354 of the support base 350. More particularly, the lower plate 362 is secured to the lower end 354 of the support base via an L-shaped, annular ring 364. A portion of the L-shaped ring 364 is secured to a portion of the lower plate 362, and another portion of the of the L-shaped ring is secured to the lower end 354 of the support base 350, thereby providing the interconnection therebetween. As shown in FIG. 2, the lower plate 362 has a larger diameter than the diameter of the support base 350, and a portion of the lower plate 362, generally adjacent an outer periphery 366 thereof, cooperates with the L-shaped ring 364 to provide an annular space 368 therebetween.

An annular seal member 370 is connected to the support base 350 and, more particularly, the seal member 370 has an annular ring shaped portion 372 which is disposed generally in the space 368, in an assembled position of the seal member 370. The ring shaped portion 372, in a preferred form, is larger than the space 368, and the seal member 370 is thus compressingly and sealingly secured in an assembled position generally in the space 368 by a plurality of bolts 374 (only two of the bolts 374 are shown in FIG. 2).

The seal member 370 has an annular seal end 376 which extends radially beyond the outer periphery 366 of the lower plate 362, and is sized to slidingly engage an adjacent portion of the inner periphery of the underwater pipeline 18, in one position of the guide coupling assembly 142. A pair of annular, tapered surfaces 378 and 380 are formed on the seal member 370, generally adjacent the seal end 376 thereof. The tapered surface 378 is sized and disposed to be engaged by fluid entering the underwater pipeline 18 via the underwater connecting end 140 thereof such that the fluid biases the seal and 376 of the seal member 370 into sealing engagement with an adjacent portion of the inner periphery of the underwater pipeline, thereby forming a fluid seal between the guide coupling assembly 142 and the underwater pipeline 18, in one position of the seal member 370. The tapered surface 378 is also sized and disposed to be cooperatingly engaged by a portion of a bias assembly, the bias assembly augmenting the sealing engagement between the seal member 370 and the adjacent portion of the inner periphery of the underwater pipeline 18, in a manner to be described in more detail below.

The tapered surface 380 is sized such that, in an assembled position of the guide coupling assembly 142, any pressure which might exist in the underwater pipeline 18, generally below the guide coupling assembly 142, will act on the tapered surface 380 in such a manner that such pressure augments the sealing engagement between the seal member 370 and the adjacent portion of the inner periphery of the underwater pipeline 18.

A cone shaped guide 382, having a cylindrically shaped base portion 384 is secured to the upper plate 356 of the guide coupling assembly 142. More particularly, one end of the cylindrically shaped base 384 is secured to an upper portion of the upper plate 356, and the opposite end of the cylindrically shaped base 384 is secured to a lower, circular-shaped end of the cone shaped guide 382. The cylindrically shaped base 384 of the cone shaped guide 382 has an outer periphery 385, and the outer surface formed by the cone shaped guide 382 and the outer periphery 385 of the base 384 are each sized and positioned on the guide coupling assembly 142 to provide a guiding surface which guidingly engages a portion of the underwater connecting end 144 to guide the underwater connecting end 144 of the one riser-section 14 into an interconnecting engagement with the underwater connecting end 140 connected to the underwater pipeline 18, in a manner to be made more apparent below.

A flat surface 386 is formed on the apex or upper end of the cone shaped guide 382, and an aperture 388 is formed through a central portion of the flat end 386. In a preferred form and as shown in FIG. 2, the rod 390 is secured in a portion of the flat end 386 of the cone shaped guide 382, the rod 390 forming the apex of the cone shaped guide 382. The rod 390 is also positioned to guidingly engage a portion of the underwater connecting end 144 of the constructed riser 12.

A cylindrically shaped support member 392 is secured to a central portion of the upper surface of the upper plate 356. The first support member 392 extends generally axially from the upper plate 356, terminating with an uppermost end 394. A portion of the support member 392, generally adjacent the uppermost end 394 thereof, is flanged radially outwardly, thereby providing an extended, substantially flat support surface 396, for reasons which will be made more apparent below.

An aperture 400 is formed through a central portion of the support member 392, and extends axially therethrough intersecting the opposite ends thereof. An aperture 402 is formed through a central portion of the upper plate 356 and, in an assembled position of the guide coupling assembly 142, the aperture 400 through the support member 392 is aligned with the aperture 402 through the upper plate 356. The apertures 400 and 402 are also axially aligned with the aperture 388 through the end 386 of the cone shaped guide 382, for reasons which will be made apparent below.

An elongated rod 404 is reciprocatingly supported in the guide coupling assembly 142. A portion of the elongated rod 404 extends through the aperture 386 and through the apertures 400 and 402. The rod 404 has an eyelet 406 formed on one end thereof, the eyelet 406 being sized larger than the aperture 388. A portion of the rod 404, generally adjacent the lowermost end 408 thereof, is threaded, for reasons which will be made apparent below.

A seal bias assembly 410 is supported in a portion of the base 350 or, more particularly, on the rod 404, generally adjacent the lower end 408 thereof. The seal bias assembly 410 is constructed to biasingly engage a portion of the seal member 370, in one position thereof, to bias the seal end 376 of the seal member 370 into sealing enegagement with an adjacent portion of the inner periphery of the underwater pipeline 18.

The seal bias assembly 410 has a cylindrically shaped base 412, having an aperture 414 formed through a central portion thereof, and opposite ends 416 and 418. The aperture 414 of the base 412 is sized to receive a portion of the elongated rod 404, generally adjacent the lower end 408 thereof, in an assembled position of the guide coupling assembly 142. A predetermined number of flanges 420 (only two of the flanges 420 are shown in FIG. 2) are connected on one end thereof to a portion of the rod 404 or, more particularly, secured on one end thereof to a portion of the outer periphery of the base 412. Each flange 420 extends radially from the base 412 terminating with an outermost end portion 422 thereof. A plurality of openings 423 (only two of the openings 423 are shown in FIG. 2) are formed through a portion of the support base 350, and each flange 420 extends through one of the openings 423.

An annular ring 424 is secured to the outermost end 422 of each flange 420. The annular ring 424 is, more particularly, cylindrically shaped, and is supported in an assembled position, shown in FIG. 2, by each of the flanges 420, each flange 420 being secured to a portion of the ring 424. An annular bias ring 426 is secured to a lowermost end portion of the cylindrically shaped ring 424, as shown in FIG. 2.

The seal bias assembly 410 and, more particularly, the bias ring 426 secured thereon is disposed in the guide coupling assembly 142 and constructed to biasingly engage a portion of the tapered surface 378 of the annular seal member 370, thereby biasing the seal end 376 of the seal member 370 into sealing engagement with an adjacent portion of the underwater pipeline 18, in one position of the seal bias assembly 410.

The seal bias assembly 410 is secured in an assembled position on the rod 404 via a nut 428 which is threadedly secured to the threaded portion 408 of the rod 404. The nut 428, more particularly, engages a portion of the end 418 of the base 412 to limit the movement of the base 412 in one direction on the rod 404.

The seal bias assembly 410 also includes a bias plate 430 having an aperture 432 formed through a central portion thereof. As shown in FIG. 2, and in an assembled position of the guide coupling assembly 142, the rod 404 extends through the aperture 432 of the bias plate 430. A flange 434 is formed on one end of the bias plate 430 and extends radially a distance therefrom, thereby providing a downwardly facing surface 436 and an upwardly facing surface 438 each extending annularly about one end of the bias plate 430.

In an assembled position, as shown in FIG. 2, the downwardly facing surface 436 engages the upwardly facing surface 416 of the base 412, and a bias spring 440 is disposed generally between the upper plate 356 secured to the support base 350 and the bias plate 430 of the seal bias assembly 410. More particularly, one end of the bias spring 440 is in engagement with a portion of the upper plate 356 and the opposite end of the bias spring 440 biasingly engages the portion of the upwardly facing surface 438 of the bias plate 430. The bias spring 440 is disposed generally about a portion of the elongated rod 404, and is sized to biasingly engage the bias plate 430, and thus the flanges 420, thereby biasingly moving the bias plate 430 and the flanges 420 in a biasing direction 442, generally toward the lower end plate 362 of the support base 350.

A stop 444 is secured to a portion of the elongated rod 404, and the stop 444 is positioned on the rod 404 generally below the upper plate 356 of the support base 350. The stop 444 has an upwardly facing surface 446 formed thereon which is shaped and positioned to engage a portion of the upper plate 356 to limit the movement of the rod 404 in a non-biasing direction 448, for reasons and in a manner to be described in greater detail below.

A guide coupling assembly 142 also includes a second support member 450 which is secured to a portion of the rod 404, generally between the eyelet 406 end thereof and the upper plate 356 via a pair of pins 452. The support member 450 has a flange formed on one end thereof extending generally radially therefrom, thereby forming an upwardly facing support surface 454 and downwardly facing surface 456 extending generally about the support 450. As shown in FIG. 2, a flange 458 is secured on one end thereof to a portion of the inner periphery of the cone shaped guide 382, thereby providing a downwardly facing surface 460 in the guide coupling assembly 142, for reasons which will be made more apparent below.

A first jack assembly 462 is disposed generally betwen the support surface 396 of the support member 392 and the downwardly facing surface 456 of the support member 450. More particularly, the base of the first jack assembly 462 is supported on the support surface 396 of the support member 392, and the reciprocating element of thefirst jack assembly 462 engages a portion of the downwardly facing surface 456 of the support member 450, in one position of the first jack assembly 462. The base of the first jack assembly 462 is thus positioned in the guide coupling assembly 142 and the reciprocating element of the first jack assembly 462 engages the elongated rod 404 via the engagement thereof with the support member 450 to move the elongated rod 404, in a manner to be described in greater detail below.

The first jack assembly 462 is constructed such that the first jack assembly 462 may be actuated to move the reciprocating element therein in a generally upward direction 464 or in a generally downwardly direction 466. Jack assemblies of a nature generally described above are well-known in the art and may be hydraulically or pneumatically operated, for example, and a detailed description of the construction and operation thereof is not required herein.

A second jack assembly 468, constructed similar to the first jack assembly 462, is disposed generally between the upwardly facing surface 454 of the support member 450 and a downwardly facing surface 460 of the flange 458. More particularly, the base of the hydraulic jack assembly 468 is supported on the upwardly facing surface 454 of the support member 450 and the reciprocating element of the second jack assembly 468 is in engagement with a portion of the downwardly facing surface 460 of the flange 458. The second jack assembly 468 is constructed to be actuated to a position wherein the reciprocating element thereof is moved in a generally upwardly direction 470 and to a position wherein the reciprocating element thereof is moved in a generally downwardly direction 472.

An access opening 473 is formed through a portion of the cone shaped guide 382, as shown in FIG. 2. The access opening 473 is shaped to permit the first and the second jack assemblies 462 and 468 to be inserted therethrough and removed therefrom, during the operation of the guide coupling assembly 142, for reasons which will be made apparent below.

The guide coupling apparatus 142 also includes a pair of clamp assemblies 474 which are partially disposed in the hollow portion of the support base 350. Each clamp assembly 474 includes a jaw member 476 which is pivotally secured to a flange 478 via a pin 480. The flange 478 is secured to a portion of the lower end of the upper plate 356.

The clamp assemblies 474 also include a jaw bias spring 482, one jaw bias spring 482 being biasingly secured to each jaw member 476. More particularly, one end of each jaw bias spring 482 is secured to one end portion of one of the jaw members 476 and the opposite end of each jaw bias spring 482 is secured to a portion of the support base 350, as shown in FIG. 2. Each jaw biasing spring 482 is sized and connected to one of the jaw members 476 to bias the jaw member 476 in a bias direction 484 to a position wherein a portion of each jaw member 476 extends radially from the support base 350 through an opening in the support base 350, and engages a portion of the underwater connecting end 140, for reasons to be made more apparent below.

One end portion of each jaw member 476 has a V-shaped flange tip 486 formed thereon. Each flange tip 486 is sized and positioned to engage a portion of the beveled surface 324 formed about the inner periphery of the underwater connecting end 140 to securedly position the guide coupling assembly 142 in an assembled position in the underwater pipeline 18.

It should also be noted that although only two clamp assemblies 474 have been shown in FIG. 2, that in actual practice a plurality of jaw assemblies 478 may be pivotally secured to the upper plate 356 and circumferentially spaced thereabout. This latter form, that is where the guide coupling assembly 142 includes a plurality of clamp assemblies 474 may be particularly desirable in a guide coupling assembly constructed to be utilized with a constructed riser and the underwater pipeline having relatively larger inner diameters.

The guide coupling assembly 142 also includes a submergible pump assembly 490 which is supported within a portion of the cone shaped guide 382 generally above the upper plate 356. The submergible pump assembly 490 is, more particularly, constructed and disposed in the guide coupling assembly 142 to pump-out any fluid existing in the constructed riser 12 and the underwater pipeline 18 generally above the seal member 370 of the guide coupling assembly 142, so that the guide coupling assembly 142 can be more easily removed from an assembled position in the underwater pipeline 18 after the constructed riser 12 has been secured to the underwater pipeline 18. Submergible pumps constructed to function in a manner generally as described above with respect to the submergible pump assembly 490 are well-known in the art, and a detailed description of the construction and operation thereof is not required herein.

An eyelet 492 is secured to a central portion of the lower plate 362. The eyelet 492 is provided to facilitate the transportation of the guide coupling assembly 142.

OPERATION OF FIGS. 2 AND 3

The guide coupling assembly 142 is constructed to guide the underwater connecting end 144 of the constructed riser 12 into a mating and interconnecting engagement with the underwater connecting end 140 of the underwater pipeline 18, and is constructed to sealingly prevent fluid from entering into the underwater pipeline 18 to maintain a maximum buoyancy of the underwater pipeline 18. In practice and in a preferred form, the underwater pipeline 18 is constructed from a marine support member such as, for example, a barge, and as each pipe-section is secured in an interconnecting relationship aboard the barge, the interconnected pipe-sections are lowered and eventually disposed on the floor of the body of water, in a manner well-known in the art. Thus, the underwater pipeline 18 is finally disposed in the water only after a sealing interconnection has been effected between the various pipe-sections, thereby substantially eliminating the build-up of water within the hollow portion of the underwater pipeline 18. The last pipe-section interconnected to the underwater pipeline 18 generally includes at least one 90 degree turn and, in some instances, will include more than one 90 degree turn, so that the end of the underwater pipeline 18 to be interconnected to the riser 12 will be disposed in a substantially vertical position, in an assembled position of the underwater pipeline 18 on the waterbody floor. In a preferred form, after the last pipe-section has been secured to the underwater pipeline 18, the guide coupling assembly 142 will be placed and secured in an assembled position generally through the underwater connecting end 140 of the underwater pipeline 18.

Prior to inserting the guide coupling assembly 142 through the underwater connecting end 140 of the underwater pipeline 18, the second jack assembly 468 is actuated to a position wherein the reciprocating element disposed therein is disengaged from the downwardly facing surface 460 of the flange 458. The first jack assembly 462 is actuated such that the reciprocating element therein engages and moves the support member 450 in an upwardly direction 464, thereby moving the elongaged rod 404 in a generally upwardly direction 464.

The elongated rod 404 is moved by the first jack assembly 462 in an upwardly direction 464 to a position wherein the stop 444 secured on the elongated rod 404 engages the upper plate 356, thereby limiting the upward movement of the elongated rod 404. It will be apparent to those skilled in the art, that when the first jack assembly is actuated to move the elongated rod 404 in an upwardly direction 464 against the bias tension of the bias spring 440, the flanges 420 will also be moved in a generally upwardly direction 464, thereby disengaging the bias ring 426 from the annular seal member 370.

In this position of the seal bias assembly 410, that is a position wherein the bias ring 426 is disengaged from the annular seal member 370, the seal member 370 is in what may be referred to as a relaxed position, and in that position, the seal member 370 will slidingly engage the inner periphery of the underwater pipeline 18. In this position, the guide coupling assembly 142 is positioned to be inserted through the underwater connecting end 140 and disposed in an assembled position in the underwater pipeline 18.

The guide coupling assembly 142 is then inserted through the underwater connecting end 140 of the underwater pipeline 18. As the guide coupling assembly 142 is being inserted downwardly through the underwater connecting end 140 of the underwater pipeline 18, the seal end 376 of the seal member 370 will slidingly engage the inner periphery of the underwater pipeline 18. Since the seal member 370 slidingly engages the inner periphery of the underwater pipeline 18 during the insertion of the guide coupling assembly 142 therein, the possibility of the seal member 370 being damaged or destroyed during the insertion of the guide coupling assembly 142 in the underwater pipeline 18 is substantially reduced.

The guide coupling assembly 142 will be lowered through the underwater pipeline 18 to a position wherein the V-shaped flange tip 486 of each jaw member 476 engages a portion of the beveled surface 322 formed about the underwater connecting end 140. The engagement of each flange tip 486 with the beveled surface 322 tends to bias each jaw member 476 in a bias direction 484. The engagement of each jaw member 476 with a portion of the upper plate 356 limits the movement of each jaw member 476 in a bias direction 484, thereby maintaining the engagement of each flange tip 486 with a portion of the beveled surface 322, and positioning the guide coupling assembly 142 in an assembled position in the underwater pipeline 18.

In the assembled position of the guide coupling assembly 142, shown in FIGS. 1 and 2, the seal member 370 is disposed in a horizontal plane generally below the upper end 300 of the underwater connecting end 140, and the cone shaped guide 382 extends a distance axially above the uppermost end 300 of the underwater connecting end 140.

After the guide coupling assembly 142 has been positioned in the underwater pipeline 18, as described above, the first jack assembly 462 is actuated to move the reciprocating element therein in a vertically downward direction 466, to a position wherein the reciprocating element is disengaged from the downwardly facing surface 456 of the support member 450. The first jack assembly 462 may then be removed via the access opening 473 from the guide coupling assembly 142.

It will be apparent from the foregoing that as the first jack assembly 462 is disengaged from the support member 450, that the elongated rod 404 will be biased in a downwardly direction 466 via the bias spring 440. The bias spring 440 will thus bias the elongaged rod 404 to a position wherein the bias ring 426 biasingly engages a portion of the tapered surface 378 of the seal member 370. The seal member 370 will be biased by the bias ring 426 in a radially outwardly direction into a sealing engagement with the adjacent portion of the inner periphery of the underwater pipeline 18.

In some applications, it may be desirable to augment the biasing action of the bias spring 440 to create an even tighter or more sealingly secure engagement between the seal member 370 and the inner periphery of the underwater pipeline 18. In those applications, the second jack assembly 468 is then actuated to move the reciprocating element therein in an upwardly direction 470 and into engagement with the downwardly facing surface 460 of the flange 458.

The second jack assembly 468 will thus bias the rod 404 in a downwardly direction, thereby augmenting the biasing force of the bias spring 440. In this manner, the bias ring 426 is moved into further engagement with the tapered surface 378 of the seal member 370, thereby increasing the sealing integrity between the seal member 370 and the underwater pipeline 18. The downward movement of the rod 404 is limited by the position of the lower plate 362 which will engage the lower end 408 of the rod 404.

After the guide coupling assembly 142 has been sealingly positioned in the underwater pipeline 18, the underwater pipeline 18 can be lowered into the body of water and positioned therein to receive and be connected to the constructed riser 12. In one form, for example, the underwater pipeline 18 including the portion thereof adjacent the underwater connecting end 140 thereof is lowered into the body of water and positioned substantially as shown in FIG. 1 with respect to the platform 16.

After the underwater pipeline 18 has been positioned in the body of water to receive the constructed riser 12, the constructed riser 12 is then lowered, the underwater connecting end 144 thereof being lowered downwardly toward the underwater connecting end 140 of the underwater pipeline 18. The guiding surface formed by the cone guide 382, including the outer periphery 385 of the base 384 thereof, will initially guidingly contact the underwater connecting end 144, and guide the underwater connecting end 144 generally toward an interconnecting relationship with respect to the underwater connecting end 140 of the underwater pipeline 18.

As the constructed riser 12 is being guided by the cone shaped guide 382 and the cylindrically shaped base 384, the lower end 310 of the underwater connecting end 144 will initially engage the tapered surface 326 of the underwater connecting end 140. A portion of the underwater connecting end 144 generally adjacent the lower end 310 thereof will move along the tapered surface 326 of the underwater connecting end 140, and ultimately will engage and move along the surface of the underwater connecting end 140 formed by the groove 320 therein. The downwardly facing surface 330 formed on the underwater connecting end 144 will engage the upwardly facing surface formed on the underwater connecting end 140 by the upper end 300 thereof, thereby limiting the downward movement of the constructed riser 12 into the underwater pipeline 18.

It should be noted that in a preferred form, a diver will position himself generally near the underwater connecting end 140 of the underwater pipeline 18 prior to the constructed riser 12 being finally lowered into a mating and interconnecting relationship therewith. The diver, in this form, will initially position the underwater connecting end 144 generally above the guide coupling assembly 142, such that the constructed riser 12 is lowered, the underwater connecting end 144 thereof will be positioned in guiding contact with the guide surface formed by the cone guide 382 and the guide surface formed by the cylindrically shaped base 384.

The diver, in a preferred form, will deactuate the second jack assembly 468 prior to the constructed riser 12 being lowered into engagement with the underwater pipeline, connect a cable (not shown) to the eyelet 406 of the elongated rod 404, and connect the proper hydraulic lines (not shown) to the submergible pump assembly 490. Thus, during that period of time while the constructed riser 12 is being lowered over the guide coupling assembly 142, the bias spring 440 provides the only biasing force acting upon the seal member 370 to bias the seal member 370 into a sealing engagement with the underwater pipeline 18.

After the underwater connecting end 144 has been positioned in interconnecting engagement with the underwater connecting end 140, the diver will then secure the constructed riser 12 to the underwater pipeline 18 by securing the bolts 340 about the interconnection therebetween. Since the slip ring 338 is in sliding engagement with the flange 328, the slip ring 338 can be easily and quickly positioned by the diver to a position wherein the bolt holes therethrough align with the bolt holes through the flange 316.

After the constructed riser 12 has been boltingly secured to the underwater pipeline 18, the submergible pump assembly 490 is actuated, and the fluid in the underwater pipeline 18 generally between the seal member 370 and the underwater connecting end 140 thereof and the fluid in the constructed riser 12 will be pumped out via the submergible pump assembly 490.

After the fluid in the constructed riser 12 and the underwater pipeline 18 has been removed therefrom by the submergible pump assembly 490, the guide coupling assembly 142 is removed by raising the cable which has been connected to the eyelet 406 of the rod 404. It will be apparent from the foregoing that as the rod 404 is pulled in an upwardly direction by the cable, the rod will be moved or reciprocated upwardly against the biasing force of the bias spring 440, thereby disengaging the bias assembly 410 from the seal member 370. The seal end 376 of the seal member 370 is thus in sliding engagement with the inner periphery of the underwater pipeline 18, as the guide coupling assembly 152 is being removed from the underwater pipeline 18 in the constructed riser 12.

As the guide coupling assembly 152 is initially pulled in an upward direction, a portion of the flange tip 486 will initially engage the lower end 310 of the underwater connecting end 144, the underwater connecting end 144 thereby biasing each jaw member 476 in a direction generally opposite the bias direction 484 and against the biasing force of the springs 482. The flange tip 486 will thus be removed from the V-shaped groove 324, and will engage the inner periphery of the constructed riser 12 as the guide coupling assembly 142 is being removed from the underwater pipeline 18 and the constructed riser 12.

After the guide coupling assembly 142 has been removed, the underwater connecting end 140 and the underwater connecting end 144 can be welded in an interconnecting position, the weld being effected generally in the groove 324 formed therebetween. In this manner, an additional sealing securedness is provided between the constructed riser 12 and the underwater pipeline 18.

It will be apparent from the foregoing to those skilled in the art that the guide coupling assembly 142, not only provides a guiding surface so that the constructed riser 12 can be quickly and efficiently guided into an interconnecting and mating engagement with the underwater pipeline 18, but also sealingly prevents fluid from entering the underwater pipeline 18, thereby maintaining the buoyancy of the underwater pipeline 18. This latter feature of the guide coupling assembly 142 is particularly important with respect to underwater pipelines and risers having relatively large diameters, since the buoyant effect resulting from the absence of water in the underwater pipeline 18 is necessary to maintain a maneuverability of the underwater pipeline 18 so that the underwater pipeline 18 can be more quickly, efficiently and safely maneuvered to a proper position to be connected to a riser. The guide coupling assembly 142 also provides the support structure for the submergible pump assembly 490, thereby enabling the constructed riser 12 to be connected to the underwater pipeline, and the fluid accumulated in the connected riser 12 to be more efficiently pumped therefrom.

It should also be noted that the underwater connecting end 140 and the underwater connecting end 144, described above, cooperate with the guide coupling assembly 142 to guide the constructed riser 12 into a mating and interconnecting engagement with the underwater pipeline 18 in such a manner that the possibility of damage occurring to the seal member 332 is minimized.

EMBODIMENT OF FIG. 4

Shown in FIG. 10 is a modified guide coupling assembly 142a which is constructed similar to the guide coupling assembly 142, shown in FIG. 2, described in detail before. The salient difference between the guide coupling assembly 142a, shown in FIG. 4, and the guide coupling assembly 152, described before, is that the guide coupling assembly 142a does not include the various components, assemblies and apparatus to provide the fluid seal between the guide coupling assembly and the underwater pipeline 18.

OPERATION OF FIG. 4

The guide coupling assembly 142a, shown in FIG. 4, will operate substantially the same as the guide coupling assembly, shown in FIG. 2, described in detail before, to guide the underwater connecting end 144 of the constructed riser 12 into interconnecting and mating engagement with the underwater connecting end 140 of the underwater pipeline 18. After the underwater connecting end 140 has been securely connected to the underwater connecting end 144 via the bolts 340, the guide coupling assembly 142 is removed from the underwater pipeline 18 in the constructed riser 12 via a cable which, in this form of the invention, is secured to the rod 390.

The modified guide coupling assembly 142a provides a guide coupling to guide the constructed riser 12 into interconnecting and mating engagement with the underwater pipeline 18, which is less expensive to manufacture, which may be useful in some applications where a presence of fluid in the underwater pipeline 18, and thus the reduced maneuverability of the underwater pipeline 18 will not detrimentally affect the overall construction operation.

EMBODIMENT OF FIG. 5

Shown in FIG. 11 is a modified underwater connecting end 140a and a modified underwater connecting end 144a, which may be utilized in cooperation with the underwater pipeline 18 and the constructed riser 12, respectively, in some applications. The salient difference between the underwater connecting end 140a, shown in FIG. 5, and the underwater connecting end 140, shown in FIGS. 2 and 3, is that the tapered surface 326a formed in the underwater connecting end 140a extends downwardly from the upper end 300, terminating with the beveled surface 322a formed about the inner periphery of the underwater connecting end 140a. The salient difference between the underwater connecting end 144a, shown in FIG. 5, and the underwater connecting end 144, shown in FIGS. 2 and 3, is that the tapered surface 336a formed on the outer periphery of the underwater connecting end 144a extends downwardly along the outer periphery of the underwater connecting end 144a, intersecting the lower end 310a thereof. In other words, the underwater connecting end 144a and the underwater connecting end 140a have single tapered mating surfaces to form the guiding interconnection therebetween.

OPERATION OF FIG. 5

The underwater connecting end 144a and the underwater connecting end 140a, shown in FIG. 5, will operate substantially the same as the underwater connecting end 144 and the underwater connecting end 140, shown in FIGS. 2 and 3, described in detail before. The tapered mating surfaces 326a and 336a cooperate to position the underwater connecting end 144a of the constructed riser 12 in mating and interconnecting engagement with the underwater connecting end 140a of the underwater pipeline 18.

The additional sealing securedness of a welded interconnection between the underwater connecting end 144a and the underwater connecting end 140a is still effected generally in the groove 324a, which is also sized to cooperate with the jaw members 476 to position the guide coupling assembly 142 in the underwater pipeline 18, in a manner similar to that described before.

It is apparent from the foregoing, that the underwater connecting end 144a and the underwater connecting end 140a, shown in FIG. 5, each retain most of the advantages of the underwater connecting end 144 and the underwater connecting end 140, described before, and yet provide a single tapered surface which may be less costly to manufacture, in some instances.

EMBODIMENT OF FIGS. 6, 7 AND 8

A preferred embodiment of the flange alignment assembly 146 is shown in detail in FIGS. 6, 7 and 8. As mentioned before, the salient purpose or function of the flange alignment assembly 146 is to properly align the bolt holes formed through a portion of the underwater connecting end 144 with the bolt holes formed through a portion of the underwater connecting end 140, so that a diver can more quickly, safely and efficiently secure the bolting interconnection between the constructed riser 12 and the underwater pipeline 18.

As mentioned before and shown in FIG. 6, the slip ring 338 has a plurality of bolt holes 500 formed therethrough and spaced circumferentially thereabout, and the flange 316 of the underwater connecting end 140 also has a plurality of bolt holes 502, shown in FIGS. 6 and 7, formed therethrough and spaced circumferentially thereabout.

In a preferred form, and as shown in FIGS. 6, 7 and 8, the flange alignment assembly 146 includes at least two pair of pin guide assemblies 504. Each pin guide assembly 504 includes a pair of removable guide members 506 which are generally triangularly shaped in one cross-section, as shown more clearly in FIG. 6, and arcuately shaped in another cross-section, as shown more clearly in FIG. 7.

Each guide member 506 has a base 508, an upper end 510 and guide sides 512 and 514, as shown more clearly in FIG. 6. In an assembled position of the pin guide assemblies 504, each base 508 is removably supported on the upwardly facing surface of the flange 316.

Each guide member 506 includes a pair of cylindrically shaped plugs 516, one end of each plug being secured to a portion of the base 508 of each guide member 506. The plugs 516 are secured and positioned on the base 508 of each guide member 506 such that, in the assembled position thereof, as shown in FIGS. 6, 7 and 8, each plug 516 is partially disposed through one of the bolt holes 502 in the flange 316. In the assembled position, each guide member 506 is positioned on the flange 316 so that one of the bolt holes 502 through the flange 316 is positioned generally between each pair of guide members 506, for reasons which will be made apparent below.

In the assembled position of each pin guide assembly 504, described above, the side 512 of one of the guide members 506 and the side 514 of the other guide member 506 of each pin guide assembly 504 cooperate to provide a generally funnel shaped guide path 518 therebetween. As shown more clearly in FIG. 6, the guide path 518 is wider generally adjacent the upper ends 510 of the guide members 506 with respect to the width of the guide path 518 generally near the bases 508 of the guide members 506. In other words, the guide path 518 generally funnels toward one of the bolt holes 502 formed in the flange 316, as shown more clearly in FIG. 7, for reasons which will be made more apparent below.

The flange alignment assembly 146 also includes one pin 520 to cooperate with each pin guide assembly 504. As shown more clearly in FIGS. 6 and 8, each pin 520 has an upper end 522 and a lower end 524, and each pin 520 is removably disposed through one bolt hole 500 in the slip ring 338 to a position wherein a portion of each pin 520 generally near the upper end 522 thereof is disposed above the upwardly facing surface of the slip ring 338.

A C-shaped clamp 526 is connected to each pin 520, generally near the upper end 522 thereof, as shown more clearly in FIG. 8. Each C-shaped clamp 526 is more particularly, pivotally secured to each pin 520 by a pivot pin 528, such that the C-shaped clamp 526 can be pivoted to a locking position wherein each C-shaped clamp 526 engages a portion of the slip ring 338 to secure the pin 520 connected thereto in an assembled position, as shown in FIGS. 6 and 8. Each C-shaped clamp 526 is also pivotable to a detached position, as shown in dashed-lines in FIG. 8.

OPERATION OF FIGS. 6, 7 AND 8

As mentioned before, the flange alignment assembly 146 is particularly constructed to align the bolt holes of the underwater connecting end 144 with the bolt holes of the underwater connecting end 140 as the constructed riser 12 is lowered into mating and interconnecting engagement with the underwater pipeline 18.

In one form, the pin guide assemblies 504 and, more particularly, each guide member 506 thereof can be positioned in an assembled position on the flange 316 prior to the lowering of the underwater pipeline 18 into the water. Each pin 520 can also be secured through one of the bolt holes 500 of the slip ring 338 prior to the lowering of the constructed riser 12 into the water.

In a preferred form, however, each pin guide assembly 504 and, more particularly, each guide member 506 is disposed on the flange 316 and each pin 520 is disposed through one of the bolt holes 500 by the diver immediately subsequent to the lowering of the constructed riser 12 into mating and interconnecting engagement with the underwater pipeline 18. Since each guide member 506 is removably positioned on the flange 316 via the plugs 516, the pin guide assemblies 504 can be easily, quickly and efficiently placed in an assembled position by the diver. After each pin 520 is inserted through one of the bolt holes 500 to an assembled position, the C-shaped clamp 526 associated therewith is moved to a locking position, shown in FIGS. 6 and 8, thereby securedly positioning each pin 520 in an assembled position.

As the constructed riser 12 is lowered generally toward the underwater pipeline 18, the pin 520 and, more particularly, the cone-shaped end 524 thereof will be disposed generally within the guide path 518 formed by the surfaces 512 and 514 of the two guide members 506 of each pin guide assembly 504. Each guide side 512 and 514 will alternately and guidingly engage a portion of the pin 520 generally adjacent the lower end 524 thereof to guide the pin 520 into the particular bolt hole disposed between the two guide members 506 of each pin guide assembly 504.

As each pin 520 is guidingly engaged by the sides 512 and 514 of the two guide members 506, the slip ring 338 will be slidingly rotated on the upper surface 329 of the flange 328 on the underwater connecting end 144. The lower end 524 of the pin 520 will ultimately then be guided into the bolt hole 502 disposed between the two guide members 506, thereby assuring an alignment between the bolt holes 500 of the slip ring 338 and the bolt holes 502 through the flange 316.

After the constructed riser 12 has been lowered a sufficient distance such that a portion of each pin 520 generally adjacent the cone-shaped end 524 thereof has been disposed through the bolt hole 502 between the guide members 506, the constructed riser 12 will be held stationary while the diver removes the guide members 506 from their assembled position on the flange 316. The constructed riser 12 will then be lowered into a mating and interconnecting relationship with respect to the underwater pipeline 18.

After the constructed riser 12 has been matingly and interconnectingly positioned in the underwater pipeline 18, the diver will then pivot each C-shaped clamp 526 to a detached position (dashed-lines in FIG. 8), and remove each pin 520. The diver can then effect the bolting interconnection between the underwater connecting end 144 and the underwater connecting end 140.

It will be apparent to those skilled in the art that the flange alignment assembly, shown in FIGS. 6, 7 and 8, and described in detail above, cooperates with the underwater connecting end 144 and the underwater connecting end 140 so that the underwater interconnection therebetween can be effected in a quicker, easier, more efficient and safer manner.

It will be apparent from the foregoing, to those skilled in the art, that the apparatus for connecting underwater pipelines described in detail above provides a safer and more efficient means for constructing an underwater riser and connecting the constructed riser to an underwater pipeline. The apparatus is also constructed such that the various interconnections, that is the interconnection between the various riser-sections 14 and the interconnection between the constructed riser 12 and the underwater pipeline are effected in a safer and more efficient manner, and in a manner substantially assuring a sealingly secure interconnection.

Changes may be made in the construction and the arrangement of the parts or the elements of the various embodiments described herein without departing from the spirit and the scope of the invention as defined in the following claims.

What is claimed is:

1. Apparatus for positioning one end of a first pipeline and one end of a second pipeline in an interconnecting relationship underwater, comprising:
   a guide coupling assembly, comprising:
      a support base, having an upper end portion and a lower end portion;
      a jaw member pivotally connected to a portion of the support base, a portion of the jaw member extending from the support base and engageable with a portion of the second pipeline limiting the movement of the support base in one direction for positioning the guide coupling in one direction in the second pipeline in one position of the jaw member;
      guide means connected to the upper end portion of the support base, having an upper end, a lower end and a portion forming a guide surface engageable with a portion of one end of the first pipeline for guiding the first pipeline into an interconnecting relationship with one end of the second pipeline; and
      means, having one portion connected to the jaw member and one portion connected to the support base, positioning the jaw member in the position engaging a portion of the second pipeline while permitting movement of the support base through a portion of the first pipeline in a direction generally opposed to the direction of movement limited via the engagement between the jaw member and the second pipeline.

2. The apparatus of claim 1 wherein the guide means is defined further as being generally cone-shaped and having an upper end and a generally circular-shaped lower end, the lower end of the cone-shaped guide connected to the upper end of the support base, the cone-shaped guide extendable axially above the end of the second pipeline in a supported position of the support base within a portion of the second pipeline, the outer surface of the cone-shaped guide means forming the guide surface.

3. The apparatus of claim 1 wherein the guide coupling assembly is further defined to include:
   an annular seal member, having an annular seal end and an annular tapered surface formed thereon, a portion of the seal member opposite the seal end thereof sealingly connected to a portion of the support base, the annular seal end of the seal member slidingly engageable with an adjacent portion of the inner periphery of the second pipeline in one position, the annular tapered surface of the seal end positioned for engagement via fluid entering the second pipeline and biasable via the entering fluid in a direction for sealing engagement with an adjacent portion of the inner periphery of the second pipeline and forming a fluid seal between the guide coupling means and the second pipeline, in one position of the seal member.

4. Apparatus for positioning one end of a first pipeline and one end of a second pipeline in an interconnecting relationship underwater, comprising:
   a guide coupling assembly, comprising:
      a support base, having an upper end portion and a lower end portion;
      means supported on a portion of the support base having a portion engageable with a portion of the second pipeline limiting the movement of the support base in one direction for positioning a portion of the support base within a portion of the second pipeline in a guiding position of the guide coupling assembly, comprising:
         a jaw member pivotally secured to a portion of the support base, a portion of the jaw member extending radially from the support base and engageable with a portion of the second pipeline for securedly positioning the guide coupling assembly in one direction in the second pipeline, in one position of the jaw member;
         a bias spring, having opposite ends, one end of the bias spring connected to a portion of the jaw member and the end of the bias spring, opposite the end thereof connected to the jaw member, connected to a portion of the support base, the bias spring biasing the jaw member in a biasing direction; and
         plate means secured to a portion of the support base, a portion of the jaw member engaging the plate means limiting the pivotal movement of the jaw member in a biasing direction and positioning a portion of the jaw member in the one position engageable with a portion of the second pipeline; and
      guide means connected to the upper end portion of the support base having an upper end, a lower end and a portion forming a guide surface engageable with a portion of one end of the first pipeline for guiding the first pipeline into an interconnecting relationship with one end of the second pipeline.

5. Apparatus for positioning one end of a first pipeline and one end of a second pipeline in an interconnecting relationship underwater, comprising:
   a guide coupling assembly, comprising:
      a support base, having an upper end portion and a lower end portion;
      means supported on a portion of the support base having a portion engageable with a portion of the second pipeline limiting the movement of the support base in one direction for positioning a portion of the support base within a portion of the second pipeline in a guiding position of the guide coupling assembly;
      guide means connected to the upper end portion of the support base, having an upper end, a lower end and a portion forming a guide surface engageable with a portion of one end of the first pipeline for guiding the first pipeline into an interconnecting relationship with one end of the second pipeline; and
      an annular seal member, having an annular seal end and an annular tapered surface formed thereon, a portion of the seal member opposite the seal end thereof sealingly connected to a portion of the support base, the annular seal end of the seal member slidingly engageable with an adjacent portion of the inner periphery of the second pipeline in one position, the annular tapered surface of the seal end positioned for engagement via fluid entering the second pipeline and biasable via the entering fluid in a direction for sealing engagement with an adjacent portion of the inner periphery of the second pipeline and forming a fluid seal between the guide coupling means and the second pipeline, in one position of the seal member; and seal bias means supported in a portion of the support base, the seal bias means having a portion biasingly engaging a portion of the annular tapered surface of the seal member biasing the seal end of the seal member in a direction for sealing engagement with an adjacent portion of the inner periphery of the second pipeline, in one position of the seal bias means.

6. The apparatus of claim 5 wherein the seal bias means is defined further to include:

an elongated rod, having opposite ends, reciprocatingly supported in a portion of the support base;

a predetermined number of flanges, each flange connected on one end thereof to a portion of the rod, generally near one end of the rod, each flange extending a distance radially from the rod terminating with an outer end portion;

an annular bias ring, having a portion connected to the outer end portion of each flange, the bias ring biasingly engaging the annular tapered surface of the seal member in a direction for sealing engagement with an adjacent portion of the inner periphery of the second pipeline, in one position of the bias spring; and a bias spring disposed about a portion of the rod, one end of the bias spring engaging a portion of the support base and the opposite end engaging a portion of the flanges biasing the rod and the flanges connected thereto in a bias direction wherein the seal ring biasingly engages the annular tapered surface of the seal member.

7. The apparatus of claim 6 defined further to include:

eyelet means connected to the rod engageable for removingly lifting the guide coupling assembly, the rod moving in a direction generally opposite the biasing direction when being lifted via the eyelet means.

8. The apparatus of claim 6 wherein the guide coupling assembly is defined further to include:

means moving the rod in a direction generally opposite the biasing direction and supporting the rod in a position disengaging the bias spring and the seal member in one position; and means moving the rod in a biasing direction augmenting the biasing force of the bias spring.

9. The apparatus of claim 8 wherein the guide coupling assembly is defined further to include:

a first support member secured within a portion of the support base, having an uppermost end and an aperture formed therethrough, a portion of the rod being reciprocatingly disposed through the aperture of the first support member;

a second support member secured to the rod spaced a distance from the first support member, having an upwardly and a downwardly facing surface, the downwardly facing surface spaced a distance from the uppermost end of the first support means; and a flange secured to a portion of the guide means forming a downwardly facing surface spaced a distance from the upwardly facing surface of the second support means; and wherein the means moving the rod in a direction generally opposite the biasing direction is defined further to include:

first hydraulic jack means disposed between and having portions engaging the uppermost surface of the first support member and the downwardly facing surface of the second support member for moving the rod connected to the second support member in an actuated position thereof; and wherein the means moving the rod in a biasing direction is defined further to include:

second hydraulic jack means disposed between and having portions engaging the upwardly facing surface of the second support member and the downwardly facing surface of the flange for moving the rod connected to the second support member in an actuated position thereof.

10. Apparatus for positioning one end of a first pipeline and one end of a second pipeline in an interconnecting relationship underwater, comprising:

a guide coupling assembly, comprising:

a support base, having an upper end portion and a lower end portion;

means supported on a portion of the support base having a portion engageable with a portion of the second pipeline limiting the movement of the support base in one direction for positioning a portion of the support base within a portion of the second pipeline in a guiding position of the guide coupling assembly; and guide means connected to the upper end portion of the support base, having an upper end, a lower end and a portion forming a guide surface engageable with a portion of one end of the first pipeline for guiding the first pipeline into an interconnecting relationship with one end of the second pipeline;

a riser underwater connecting end, having an upper end and a lower end, the upper end portion connectable to one end of the first pipeline; and a pipeline underwater connecting end, having an upper end and a lower end, the lower end thereof connectable to one end of the second pipeline, a beveled surface formed on a portion of the pipeline underwater connecting end engaging the portion of the means positioning a portion of the support base within a portion of the second pipeline limiting the movement of the support base in one direction.

11. The apparatus of claim 10 wherein the riser underwater connecting end includes: a radially outwardly tapering groove formed in the outer periphery of the riser underwater connecting end intersecting a portion of the lower end thereof, thereby forming an annular tapered surface extending about the outer periphery of the riser underwater connecting end; and wherein the pipeline underwater connecting end includes: a radially inwardly tapering groove formed in the inner periphery thereof intersecting a portion of the upper end thereof, thereby forming an annular tapered surface extending about a portion of the inner periphery of the pipeline underwater connecting end, the annular tapered surface of the pipeline underwater connecting end guidingly and matingly engaging the annular tapered surface of the riser underwater connecting end in an interconnected position of the first and the second pipelines.

12. The apparatus of claim 11 wherein the pipeline underwater connecting end is defined further to include: an annular flange formed on the outer periphery thereof, extending generally radially therefrom and an annular raised face formed on a portion of the flange extending generally axially from the annular flange terminating with an upper end, a plurality of bolt holes formed through the flange spaced circumferentially about the flange; and wherein the riser underwater connecting end is defined further to include: an annular flange formed on the outer periphery thereof extending generally radially therefrom, thereby forming an annular downwardly facing surface and an annular upwardly facing surface, the annular downwardly facing surface engaging the upper end formed on the pipeline underwater connecting end in an interconnected position of the first and the second pipelines; and wherein the apparatus is defined further to include:

an annular slip ring disposed about the riser underwater connecting end, a portion of the annular slip ring slidingly engaging the upwardly facing surface formed by the flange about the outer periphery of the riser underwater connecting end, the slip ring being supported in one direction thereby, a plurality of bolt holes being formed through a portion of the slip ring and spaced circumferentially thereabout to align with the bolt holes formed in the flange formed on the pipeline underwater connecting end in one position of the slip ring, for bolting interconnection between the riser and the underwater pipeline.

13. The apparatus of claim 12 defined further to include:

a pin having an upper and lower end, the pin disposed through one of the bolt holes in the slip ring and one of the bolt holes of the flange of the riser underwater connecting end in one position;

clamp means connected to the pin generally adjacent the upper end thereof, the clamp means engaging a portion of the slip ring in one position of the clamp means to secure the pin in an assembled position, a portion of the pin extendable through one of the bolt holes in the slip ring and a portion of the pin generally adjacent the lower end thereof extendable a distance downwardly from the slip ring in an assembled position of the pin; and a pair of guide members, each guide member removably supportable on a portion of the flange formed on the pipeline underwater connecting end and extendable a distance generally upwardly therefrom, each guide member having a guide side, the guide sides of the two guide members defining a guide path in an assembled position of the guide members, each guide side engageable by a portion of the pin generally adjacent the lower end of the pin in one position of the pin for guiding a portion of the pin through one of the bolt holes of the flange formed in the pipeline underwater connecting end.

14. Apparatus for connecting underwater pipelines, comprising:

a first pipeline having an underwater connecting end;

a second pipeline having an underwater connecting end and a beveled surface formed on a portion of the underwater connecting end portion of the second pipeline, the underwater connecting end of the second pipeline connectingly engageable with a portion of the underwater end of the first pipeline in a connected position of the first and the second pipelines; and a guide coupling assembly, comprising:
a support base, having an upper end portion and a lower end portion;
means supported on a portion of the support base having a portion engageable with a portion of the beveled surface formed on a portion of the underwater connecting end portion of the second pipeline limiting the movement of the support base in one direction for positioning a portion of the support base within a portion of the second pipeline in a guiding position of the guide coupling assembly; and
guide means connected to the upper end portion of the support base having an upper end, a lower end and a portion forming a guide surface engaging a portion of the underwater connecting end portion of the first pipeline guiding the first pipeline into an interconnecting relationship with one end of the second pipeline.

15. Apparatus for positioning one end of a first pipeline having a flange formed about a portion of the outer periphery thereof forming a downwardly and an upwardly facing surface in an interconnecting relationship with one end of a second pipeline having a flange formed about a portion of the outer periphery thereof and a plurality of bolt holes formed through the flange, comprising:

a slip ring disposable about the outer periphery of the first pipeline, slidingly engageable with the upwardly facing surface formed by the flange formed on the first pipeline and supported in one direction thereby, a plurality of bolt holes formed through a portion of the slip ring alignable with the bolt holes formed through the flange of the second pipeline in one position of the slip ring;

a pin, having an upper and lower end, disposable through one of the bolt holes in the slip ring and one of the bolt holes of the flange of the second pipeline in one position;

clamp means connected to the pin generally adjacent the upper end thereof, the clamp means engageable with a portion of the slip ring in one position of the clamp means securing the pin to the slip ring, a portion of the pin, generally near the upper end portion thereof, extendable through one of the bolt holes of the slip ring and a lower end portion of the pin extendable a distance downwardly from the slip ring in an assembled position of the pin and the slip ring; and a pair of guide members, each guide member removably supportable on a portion of the flange formed on the second pipeline and having a portion extendable a distance generally upwardly from the flange of the second pipeline in a supported position of the guide members on the flange of the second pipeline, each guide member having a guide side, the guide members positionable on the flange of the second pipeline positioning the guide sides of the guide members to define a guide path, the guide sides guidingly engageable with a portion of the pin generally near the lower end of the pin for guiding a portion of the pin through one of the bolt holes of the flange formed on the second pipeline aligning the bolt holes of the first and the second pipelines; and guide coupling means having a portion positionable within a portion of the second pipeline and a portion engageable with a portion of the first pipeline for guiding one end of the first pipeline into an interconnecting relationship with one end of the second pipeline.

* * * * *

UNITED STATES PATENT OFFICE
CERTIFICATE OF CORRECTION

Patent No. 3,845,972          Dated November 5, 1974

Inventor(s) Billy L. O'Brien and Heber P. O'Brien

It is certified that error appears in the above-identified patent and that said Letters Patent are hereby corrected as shown below:

Column 1, line 9, "RISER" should be --RISERS--.

Column 2, line 28, "thefirst" should be --the first--.

Column 13, line 52, "35" should be --350--.

Column 14, line 40, "and" should be --end--.

Column 17, line 23, 'thefirst" should be --the first--.

Column 22, line 27, "152" should be --142--.

Column 22, line 29, "152" should be --142--.

Column 23, line 20, "152" should be --142--.

Signed and sealed this 7th day of January 1975.

(SEAL)
Attest:

McCOY M. GIBSON JR.          C. MARSHALL DANN
Attesting Officer          Commissioner of Patents